H. A. JONES AND E. W. STRUVE.
SAW GRINDING JIG.
APPLICATION FILED JAN. 20, 1920.

1,385,175. Patented July 19, 1921.

Inventors
Harry A. Jones
and Edward W. Struve

UNITED STATES PATENT OFFICE.

HARRY A. JONES AND EDWARD W. STRUVE, OF PARSONS, KANSAS.

SAW-GRINDING JIG.

1,385,175.  Specification of Letters Patent.  Patented July 19, 1921.

Application filed January 20, 1920. Serial No. 352,657.

*To all whom it may concern:*

Be it known that we, HARRY A. JONES and EDWARD W. STRUVE, citizens of the United States, residing at Parsons, in the county of Labette and State of Kansas, have invented certain new and useful Improvements in Saw-Grinding Jigs, of which the following is a specification.

This invention aims to facilitate the work of truing the cutting edge of circular saws whether designed for metal or wood working and to enable such work to be conveniently and easily performed.

Figure 1:
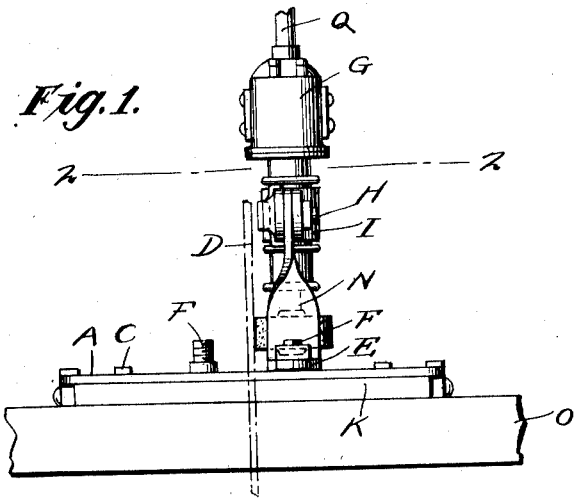
Figure 2:
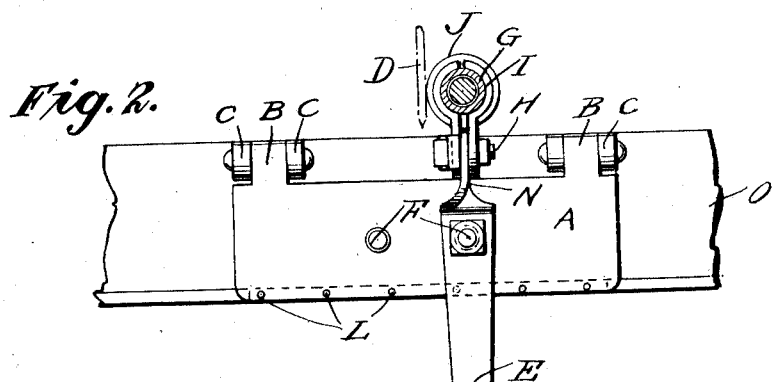
Figure 3:
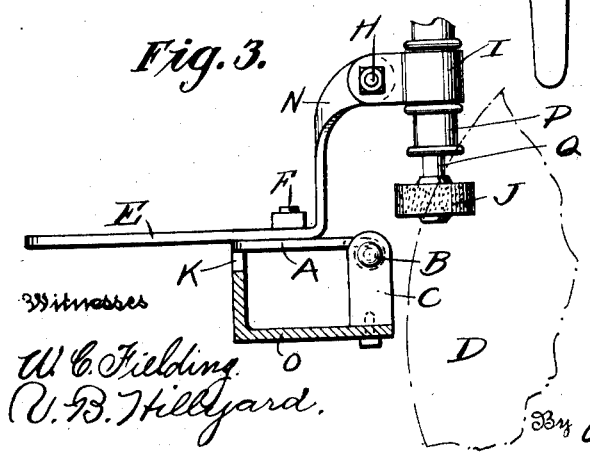

With these ends in view and such others as will appear as the nature of the invention is described, reference is to be had to the following description and the drawings hereto attached, in which, Figure 1 is a front view of a saw grinding jig embodying the invention, Fig. 2 is a horizontal section thereof on the line 2—2 of Fig. 1, Fig. 3 is a detail view of a portion of the jig in side elevation, the supporting table being in cross section.

Corresponding and like parts are referred to in the following description and accompanying drawings by like reference characters.

The device comprises a standard N and a base A, the latter being pivotally connected at one edge to uprights C disposed at one edge of a supporting table O. A lever E is pivotally mounted upon the base A and the standard N preferably forms a part thereof. By having the lever E pivoted to the base A and the latter in turn pivoted to the supporting table O, the device is capable of a two fold adjustment as will be readily understood. The saw to be ground is indicated by the letter D. Two studs F are provided upon the base A and are disposed upon opposite sides of the saw D. The lever E is adapted to be mounted on either one of the studs F so that the grinding wheel may be positioned to operate on either side of the saw as may be required. The supporting table O is shown as consisting of a bar which is of L-form in cross section. The uprights C are disposed at the edge of the bar opposite the vertical flange. The base A is formed at its pivotal edge with knuckles B which are adapted to fit between the uprights C and receive the pivot fastenings. A strip K attached by rivets or other fastenings L to the swinging edge of the base A is disposed upon the lower side of the base in position to rest upon the vertical flange of the table O.

A clamp sleeve I is pivotally connected to the upper end of the standard N as indicated at H and receives a vertical sleeve P in which is journaled a shaft Q which is adapted to be driven from a suitable source of power such as an air motor G. A grinding wheel J is attached to the lower end of the shaft Q.

When it is required to true or grind a saw, the grinding mechanism is adapted to the base A so that the grinding wheel J will operate upon one side of the saw blade. When the opposite side of the saw is to be ground, the grinding device is fitted to the other one of the studs F as will be readily understood. When the motor G is in operation, the grinding wheel J is rotated and by manipulating the lever E the grinding wheel may be moved laterally or tilted. The lateral movement of the grinding wheel is effected by movement of the lever E on its supporting stud. Tilting movement is effected by swinging the base A on its pivot connection with the uprights C. The angular adjustment of the grinding wheel may be effected by tilting the sleeve clamp I about the pivot bolt H, which forms the connecting means between the clamp sleeve I and the standard N.

Having thus fully described our invention what we claim as new and desire to secure by Letters Patent, is:—

In a device of the character set forth, a supporting table, an angular flange extending therefrom, uprights at the edge of the table opposite the flange, a base pivoted to the uprights at one edge and adapted to have its opposite edge supported by means of the flange of the table, a standard pivotally mounted upon the base and provided with an operating handle, and a grinding wheel carried by the standard.

In testimony whereof we affix our signatures in presence of two witnesses.

HARRY A. JONES.
EDWARD W. STRUVE.

Witnesses:
JOHN S. WOOD,
C. W. ORNER.